United States Patent [19]

Tatai et al.

[11] Patent Number: 4,923,647
[45] Date of Patent: May 8, 1990

[54] PROCESS FOR THE VULCANIZATION OF LAMINAR RUBBER PRODUCTS

[75] Inventors: Ilona Tatai; Tibor Penziás; László Palotás; Elemér Lantos; Péter Smaroglay; László B. Deák, all of Budapest, Hungary

[73] Assignee: Taurus Gumiipari Vallalat, Budapest, Hungary

[21] Appl. No.: 128,281

[22] Filed: Dec. 3, 1987

[51] Int. Cl.$^5$ .................. B32B 31/20; B32B 31/26
[52] U.S. Cl. .................... 264/27; 156/160; 156/274.2; 156/289; 156/344; 264/346; 264/DIG. 46
[58] Field of Search ............ 264/25, 27, 347, D46; 156/289, 323, 344, 273-279, 274.2, 160, 229

[56] References Cited

U.S. PATENT DOCUMENTS

| | | | |
|---|---|---|---|
| 2,142,971 | 1/1939 | Bierer | 264/347 |
| 2,142,972 | 1/1939 | Bierer | 264/347 |
| 3,094,453 | 6/1963 | Scherer | 156/323 |
| 3,491,186 | 1/1970 | Rainar | 264/295 |
| 3,507,735 | 4/1970 | chisholm | 156/273.9 |
| 3,767,500 | 10/1973 | Tally | 156/184 |
| 3,894,897 | 7/1975 | Batchelor | 156/274.2 |
| 3,929,537 | 12/1975 | Erwin | 156/184 |
| 4,096,008 | 6/1978 | Taylor | 156/273.9 |
| 4,193,956 | 3/1980 | Kaluins | 156/273.7 |
| 4,744,851 | 5/1988 | Lorenz | 156/289 |

Primary Examiner—Merrell C. Cashion, Jr.
Attorney, Agent, or Firm—Schweitzer & Cornman

[57] ABSTRACT

An apparatus and process for the vulcanization of laminar rubber products wherein the process comprises winding onto a drum an unvulcanized laminar rubber product together with a metallic band, applying a counter force to the metallic band as it is being wound up to prestress the wound up layers, applying substantially uniform pressure on the surface of the conducting band at the point where it and the laminar rubber products are being wound onto the drum and then applying electrical current to the wound up electrically conducting band to provide heat for the vulcanization of the wound up laminar layers. The apparatus comprises two parallel drums interconnected by the metallic band which is first wound with the laminar rubber onto one drum and when the vulcanized laminar rubber is removed the metallic band is wound onto the other drum.

2 Claims, 2 Drawing Sheets

PROCESS FOR THE VULCANIZATION OF LAMINAR RUBBER PRODUCTS

FIELD OF THE INVENTION

The invention relates to a process and apparatus for the vulcanization of laminar rubber products.

BACKGROUND OF THE INVENTION

Extensively used processes are known for the vulcanization of large rubber sheets and belts. According to a solution the rubber sheet together with the fabric for preventing the layers sticking to each other, is wound on a steel drum, then the wound up material is heated in boiler with steam or hot air, and is then vulcanized.

The drawback of that process is that the vulcanization takes relatively long time, because the dissipation of heat transfer takes places from outside inward, and the heat passes to the central threads of the coil only at a slow rate by means of thermal conduction. The degree of vulcanization of the different layers varies, detrimentally influencing the characteristics of the rubber. The poor thermal conduction and the varying vulcanization of the layers determine the coil thickness on the drum, i.e. the length of the rubber sheet. Thus this type of vulcanization of several hundred meter long rubber sheet is out of the question. The vulcanizing boilers are generally pressure tight vessels with steel wall, becoming heated in the process of vulcanization which results in substantial heat loss. Surface of the accompanying fabric becomes indented, thereby producing similar indentations on the surface of the rubber.

Two processes have been generally used for vulcanization of rubber belt. In one of them the vulcanization takes place between pressing plates. These are compressed with hydraulic cylinders during the process of vulcanization. Length of the pressing plates is max. of 15 m, being the same length of the belt vulcanized in a single cycle. Consequently the vulcanization of several hundred meter long belt takes a very long time.

The appropriate degree of vulcanization of the belt-zones at the end of the pressing plates is problematic in this process. Separate tensioning unit is required during the vulcanization process for tensioning the belt section to be vulcanized.

In the other known process the vulcanization is not intermittent but continuous. Here the belt is pressed onto a slowly rotating heated metal cylinder with a pressing band. The cylinder must rotate at a very slow rate, because the belt should be vulcanized while it is in contact with the cylinder. Hence the vulcanization of several hundred meter long belt takes a very long time. Such a process is described in the German Federal Republic Patent No. 2,856,646.

A drawback of both processes in addition to those mentioned above is the considerable heat loss. The heat losses are due to the fact, that not only the rubber materials to be vulcanized have to be also heated, but also the bulky machine parts.

So far no process is known which would vulcanize several hundred meter long belts or rubber sheets in a single step in a short time, with low heat loss.

DESCRIPTION OF THE INVENTION

The invention is aimed at providing a process and apparatus which enables the one-step vulcanization of several hundred meter long rubber sheet and belt with the use of extremely low thermal energy in a short time.

The essence of the process according to the invention is that an unvulcanized rubber sheet of belt is wound on a drum together with an electrically heated flexible windable, preferably prestressed metal sheet, so that in wound up position the metal sheet is in contact with the entire surface of the rubber sheet or belt, and the vulcanization is carried out with electric current conducted into the metal sheet and/or metal inserts of the product to be vulcanized.

The pressure required for vulcanization is produced on the rubber surface by the extent of prestressing the band. In respect of the electric current, the metal sheet acts as an electric resistance in which heat is generated upon the effect of the current. If cross section of the metal sheet does not change, the heat generation is steady, i.e. the same amount of heat will develop on any part surface of the sheet. This way the rubber sheet or belt is evenly heated i.e. vulcanized along its whole area.

The electric vulcanization can also be accomplished with metal inserts in the rubber sheet. The temperature is measured during vulcanization, and by regulating the electric voltage, it is kept at the required value.

The coil can be thermally insulated during vulcanization preferably on each side, to reduce the heat losses. It is beneficial to form a pressureresistant heat insulating layer, e.g. from tetrafluorethylene polymer (Teflon) between the drum mantle and the coil. A plate coated with heat and electric insulating layer is placed against both sides of the coil. the exterior of the coil is covered with heat insulating layer, e.g. with mineral cotton quilt, or asbestos cloth.

When thick rubber sheets or belts are vulcanized, their sides are also confined to prevent the rubber from running off during vulcanization.

In the latter case, during winding up the rubber sheets or belts, highly electric-resistant, heat and pressure resistant, e.g. tetrafluoroethylene polymer (Teflon) webbing is also wound up.

During winding air holes may develop between the wound up raw rubber sheet or belt and the metal sheet. This can be prevented by using a pressure pulley where the raw rubber sheet or belt meet with the metal sheet during winding up. The pressure pulley, in addition to the aforementioned effect, increases the tightness of the band during winding, thus increasing the pressure within the coil during vulcanization.

If one surface of the rubber sheet or belt is to be provided with an indented pattern, then an element can be wound up between the rubber material and current conductor metal sheet. The metal pattern of the element then becomes indented into the surface of the rubber sheet during vulcanization.

The essential feature of the apparatus according to the invention is that it has two parallel axial drums interconnected with a flexible, windable metal sheet suitable for current conduction, which in wound-up position is in contact with the entire surface of the rubber sheet or belt. Connections suitable for hookup of electric current are formed at both ends of the metal sheet and the apparatus is provided with elements for winding up and with braking units.

DESCRIPTION OF THE DRAWING

The invention is described by way of example only, with reference to the accompanying drawings, in which.

DESCRIPTION OF THE PREFERRED EMBODIMENT

Figure 1:
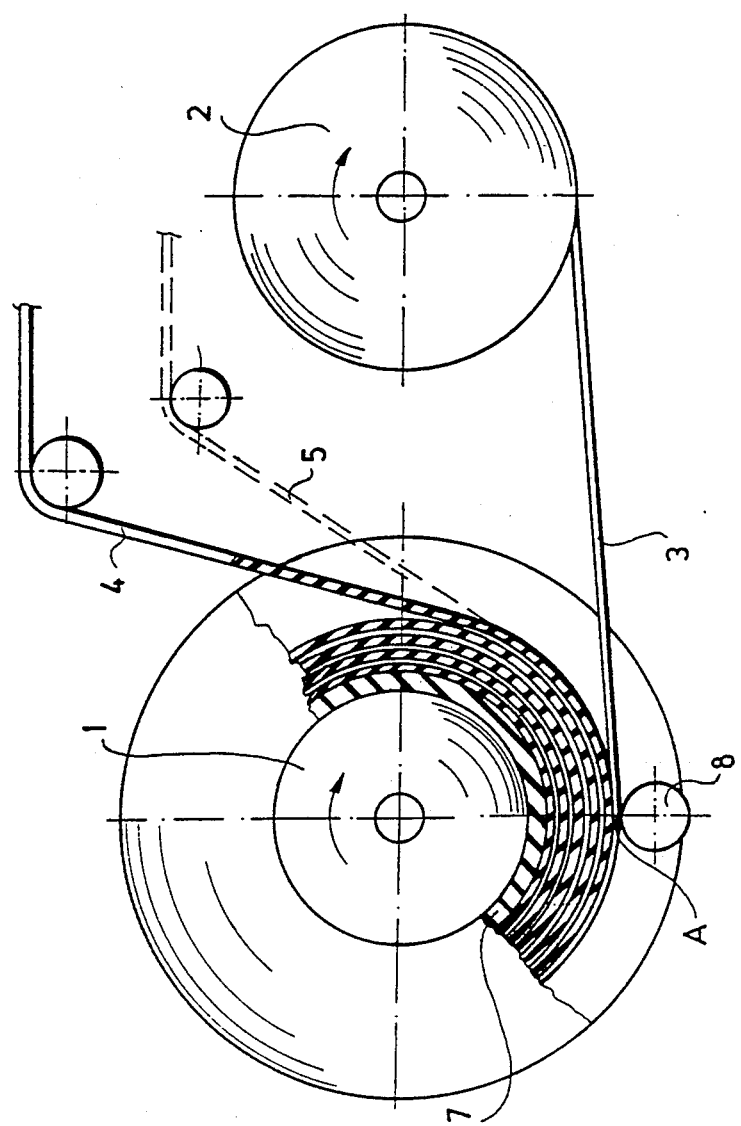
FIG. 1 is a side view of the apparatus partly in section.
Figure 2:
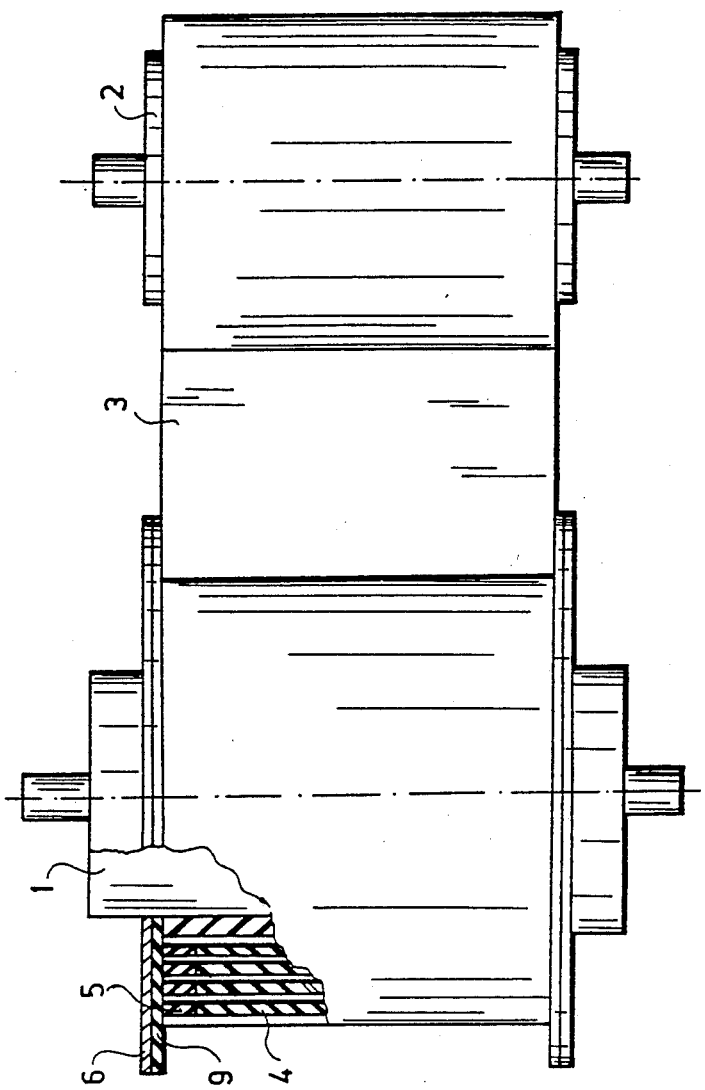
FIG. 2 is a top view of the apparatus partly in section.

Parallel drums 1 and 2 are the main parts of the vulcanizing apparatus. These are interconnected by a current conductor metal sheet or band 3, the width of which is essentially the same as that of drums 1 and 2. The length of the sheet is adapted to the requirements, and may be several meters long.

The current conductor metal band 3 is led to the drums 1 or 2 tangentially. The drums 1 and 2 are provided with axes which have their bearing supported in the frame of the equipment. The axes are electrically insulated the drums 1 and 2.

The laminar rubber product to be vulcanized can be rubber sheet or rubber belt 4.

If necessary, a retaining side webbing 5, suitably supported by a plate 6 covered with a heat insulating layer 9 is arranged on the outside of the rubber belt 4.

A pressure pulley 8 is arranged at the point where the metal band 3 runs up onto the coil with the rubber belt 4.

The apparatus according to the invention functions as follows:

In the initial position nearly the entire current conductor metal band 3 is wound up the drum 2, and only a few turns remain on the drum 1. The rubber sheet or belt 4 is guided from a storage unit (not illustrated) to the current conductor metal band 3, then this metal band 3 together with the rubber sheet 4 is wound over the drum 1, so that only a few turns remain on the drum 2. The rubber belt 4 when guided into the apparatus can be prestressed.

During the winding the drum 1 is driven and the drum 2 is braked. Thus tensioning force arises in the current conductor band 3. The tensioning force affects the rubber sheet of belt 4 wound up on the drum 1. The braking of drum 2 is changed to maintain the surface pressure arising from the tensioning force, i.e. the pressure applied to the rubber sheet or belt 4 approximately constant during the entire process of winding over even when the diameter of the drum varies.

At the end of winding over, drums 1 and 2 are braked as a result of which the current conductor band 3 does not become loose. This is followed by vulcanization itself. The two poles of the electric current are connected to the metal band on drum 1 or 2, thus the current flows along the length of the current conductor band 3 and heats it at uniform rate. The temperature can be regulated by changing the voltage and thus the required temperature is adjustable. It is advisable to cover the coil with heat insulting quilt to prevent heat loss.

Upon completion of the vulcanization the direction of rotation of the drums is reversed and current conductor metal band 3 is wound up on drum 2 while the vulcanized rubber sheet or belt is wound off from drum 1 for recovery, and it passes into a cooling phase (not illustrated).

One or more vulcanizers are arranged after the starting material storage can be adapted to service several vulcanizers at a continuous rate. Several vulcanizers may be arranged for example directly after the calendar rolls used to prepare rubber sheet or belt 4 for vulcanization and thus they can be continuously serviced.

When thick rubber sheets or belts 4 are produced, the webbing 5 on both sides is suitably also employed. Plate 6 covered with heat insulating layer 9 supports the webbing 5 against displacement. This way the webbing 5 prevents any lateral run-off of the rubber during vulcanization.

Pressure pulley 8 is used during winding to exclude air holes and to increase the compressive force.

In addition to the benefits outlined inthe foregoing, a further advantage of the solution according to the invention is that during vulcanization the product is covered on the outside by a few threads of band, while webbing covers it on its side, thus the product is vulcanized in a closed space resulting in the production of high quality vulcanized product.

We claim:

1. A process for the vulcanization of laminar rubber products, comprising winding onto a drum an unvulcanized laminar rubber product together with a flexible, windable, electrically conducting band,
    and together with a heat resistant, electrically nonconducting layer between said laminar rubber product and said electrically conducting band, said layer having a pattern thereon
    applying a force to said band the direction of said force being counter to the direction of winding for prestressing said wound up rubber product together with said band, applying substantially uniform pressure on the surface of said conducting band substantially at the point at which it and said laminar rubber product are being wound onto said drum, and applying electrical current to the wound up electrically conducting band until the wound up laminar rubber product becomes vulcanized, and recovering the vulcanized laminar rubber product.

2. A process for the vulcanization of laminar rubber products, comprising winding onto a drum an unvulcanized laminar rubber product together with a flexible, windable, electrically conducting band, applying a force to said band the direction of said force being counter to the direction of winding of prestressing said wound up rubber product together with said band, applying substantially uniform pressure on the surface of said conducting band substantially at the point at which it and said laminar rubber product are being wound onto said drum, winding a boundary webbing at least along one edge of said laminar rubber poduct as said laminar product and said conducting band are being wound onto said drum, for preventing rubber from rubbing out from between layers of the wound up conducting band while the rubber is being vulcanized, and applying electrical current to the wound up electrically conducting band until the wound up laminar rubber product becomes vulcanized, and recovering the vulcanized laminar rubber product.

* * * * *